Oct. 27, 1925.
J. HASTREITER
1,559,094
PROCESS AND MACHINE FOR FIRE POLISHING GLASS
Filed April 22, 1925
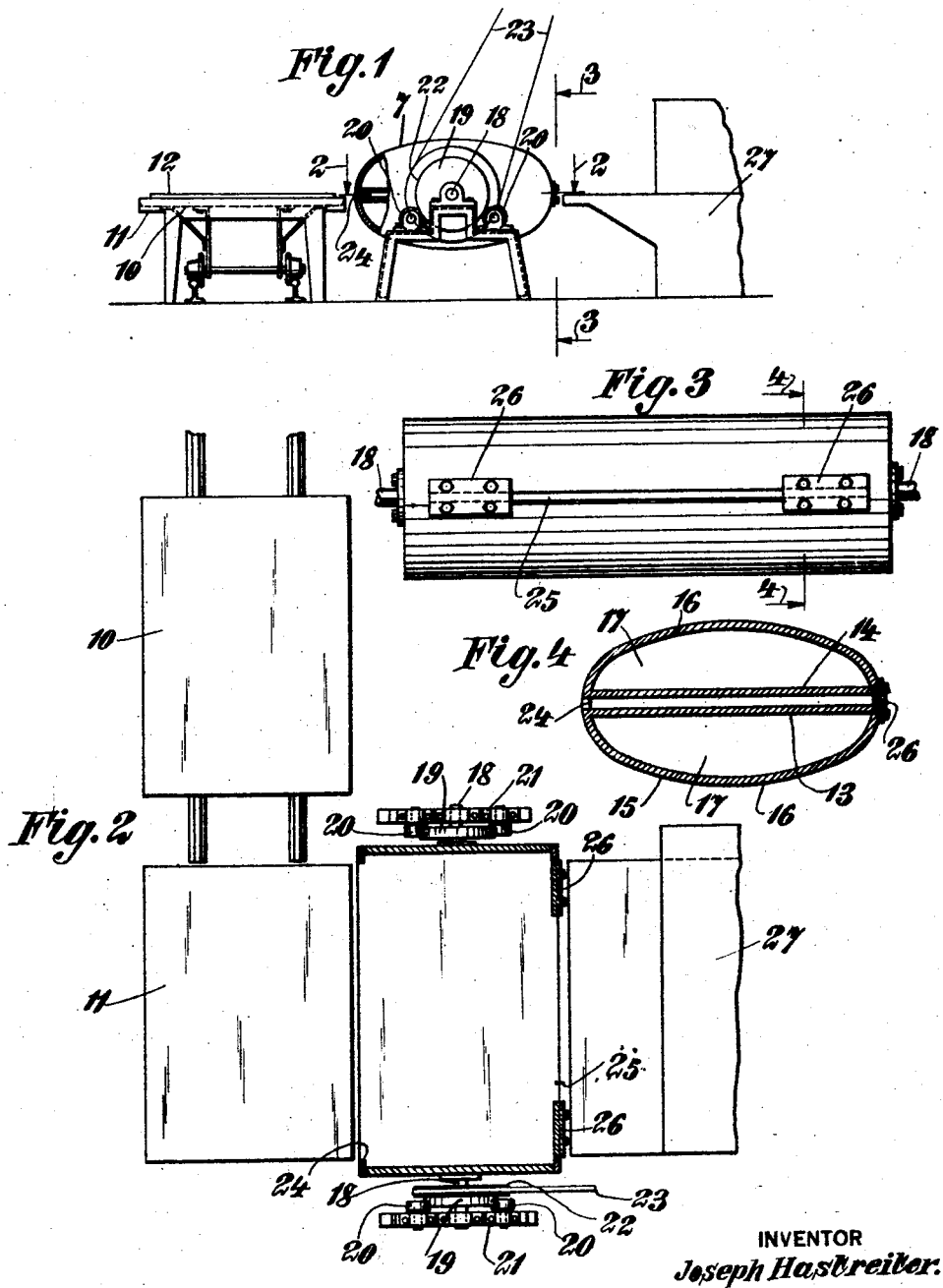
INVENTOR
Joseph Hastreiter.
BY
ATTORNEY Patented Oct. 27, 1925.

1,559,094

UNITED STATES PATENT OFFICE.

JOSEPH HASTREITER, OF MORGANTOWN, WEST VIRGINIA.

PROCESS AND MACHINE FOR FIRE-POLISHING GLASS.

Application filed April 22, 1925. Serial No. 24,912.

*To all whom it may concern:*

Be it known that I, JOSEPH HASTREITER, a citizen of the United States, residing at Morgantown, in the county of Monongalia and State of West Virginia, have invented certain new and useful Improvements in Processes and Machines for Fire-Polishing Glass, of which the following is a specification.

This invention relates to improvements in machines and processes for fire polishing sheet glass and has as one of its objects the provision of means for shortening and simplifying the art of sheet glass making.

Another purpose is to produce a revoluble device for transferring a sheet of glass from the casting table to a leer, the device partaking of the nature of a muffle and adapted to maintain the glass plate flat and free from bending.

A further aim is to produce a polished surface on the plate during its transmission, and to operate on a glass having a figured or prismatic surface as well as on smooth, flat surfaced sheets.

These several objects are attained by the novel process and mechanisms hereafter described and shown in the accompanying drawing, forming a material part of this disclosure, and in which:—

Figure 1 is a side elevational view of an apparatus made in accordance with the invention.

Figure 2 is a partial plan and sectional view of the same, the section being taken on line 2—2 of Figure 1.

Figure 3 is an enlarged rear elevational view of the transfer drum, looking on line 3—3 of Figure 1.

Figure 4 is a transverse sectional view taken on line 4—4 of Figure 3.

Referring more in detail to the drawing, the numeral 10 designates a pouring table mounted on a truck movable on a track to a point adjacent a polishing table 11 from which the glass plate 12 may be transferred to the space between two plates 13 and 14 secured in a drum 15.

Said drum is generally elliptical in the cross-section of its outer walls 16 which enclose spaces 17 and is fixed on spindles 18 having at their ends circular discs 19 resting on rolls 20 rotatable on studs extending inward from support frames 21 secured to the floor at such height that the drum can rotate, the space between the plates being in a plane uniform with the top of the table 11.

On one of the spindles is fixed a sprocket wheel 22, driven by a chain 23, this chain being actuated periodically and uniformly to rotate the drum 180 degrees or in other words, cause exact reversal of its position, said drum being essentially a muffle.

Entry to the space between the plates 13 and 14 is through the slot 24, a similar slot 25, at the opposite side, being shortened by cleats 26 bolted on the outer surface.

In operation, the plate 12 is passed through the slot 24, whereupon the drum is rotated, the glass plate being held from sliding out by gravity by the cleats as it is reversed.

When complete reversion has taken place, the plate 12 is passed out through the slot 24 upon the apron of a leer 27 to gradually cool.

It is to be understood that the heat contained in the drum prevents premature cooling of the glass plate maintaining it substantially constant and that reversing the plate prior to entering the leer acts to unify the fire polish on the side of the sheet that formally lay upon the table, tending to smooth the same and increase its transparency.

This is noticeable in the case of figured glass or sheets having irregular surface, which obviously cannot be polished by other means.

Having thus described my invention, what I claim as new and desire to secure by Letters Patent, is:—

1. In a glass working apparatus, the combination with a polishing table and a leer, of a drum intermediate the table and leer, said drum having two interior flat walls closely spaced and enterable from one side, and means to rotate said drum to cause reversal thereof.

2. In a glass working apparatus, the combination with a polishing table and a leer, of a drum intermediate the table and leer, said drum having two interior flat walls closely spaced and enterable from one side, means on the opposite sides to partially close the space between said walls, and means for confining heat in said drum adjacent said walls.

In witness whereof I have affixed my signature.

JOSEPH HASTREITER